US012763056B2

(12) United States Patent
Allan et al.

(10) Patent No.: US 12,763,056 B2
(45) Date of Patent: Oct. 13, 2026

(54) COMPONENT FOR MANIPULATING AN INPUT SHOCKWAVE

(71) Applicant: FIRST LIGHT FUSION LIMITED, Yarnton (GB)

(72) Inventors: Peter Allan, Yarnton (GB); Matthew Betney, Yarnton (GB); Hugo Doyle, Yarnton (GB); Thomas Edwards, Yarnton (GB); Nicholas Hawker, Yarnton (GB); James Pecover, Yarnton (GB); Jonathan Skidmore, Yarnton (GB)

(73) Assignee: FIRST LIGHT FUSION LIMITED, Yarnton (GB)

(*) Notice: Subject to any disclaimer, the term of this patent is extended or adjusted under 35 U.S.C. 154(b) by 291 days.

(21) Appl. No.: 18/360,668

(22) Filed: Jul. 27, 2023

(65) Prior Publication Data

US 2024/0046907 A1 Feb. 8, 2024

(30) Foreign Application Priority Data

Aug. 5, 2022 (GB) ..................................... 2211489

(51) Int. Cl.
*G10K 11/02* (2006.01)
*G10K 11/26* (2006.01)
(Continued)

(52) U.S. Cl.
CPC .................................. *G10K 11/025* (2013.01)

(58) Field of Classification Search
CPC ...... G10K 11/025; G10K 11/30; G10K 11/18; G10K 11/28; G10K 11/24; G10K 11/26;
(Continued)

(56) References Cited

U.S. PATENT DOCUMENTS

| | | | | |
|---|---|---|---|---|
| 3,714,332 A | 1/1973 | Rasquin et al. | | |
| 4,003,383 A * | 1/1977 | Bruck | G01N 31/10 | 601/4 |

(Continued)

FOREIGN PATENT DOCUMENTS

| | | |
|---|---|---|
| CN | 113939072 A | 1/2022 |
| CN | 116543927 A | 8/2023 |

(Continued)

OTHER PUBLICATIONS

Combined Search and Examination Report under Sections 17 and 18(3) for United Kingdom Patent Application No. GB2211489.6 dated Sep. 29, 2022, 10 pages.

(Continued)

*Primary Examiner* — Edgardo San Martin
(74) *Attorney, Agent, or Firm* — Withrow + Terranova, PLLC; Vincent K. Gustafson

(57) ABSTRACT

A component for manipulating an input shockwave. The component includes a body comprising a first material. The body defines a cavity for manipulating the input shockwave so to produce a manipulated shockwave. The cavity comprises an input for receiving the input shockwave incident upon the component and an output for outputting the manipulated shockwave from the cavity. The cavity contains a second material having a shock-impedance that is lower than a shock-impedance of the first material.

18 Claims, 8 Drawing Sheets

(51) Int. Cl.

| | |
|---|---|
| ***G10K 11/28*** | (2006.01) |
| ***G10K 11/30*** | (2006.01) |
| ***G10K 15/04*** | (2006.01) |

(58) Field of Classification Search
CPC ........ G10K 11/02; G10K 11/00; G10K 15/04; G10K 15/043; G21B 3/00; G21B 3/006; G21B 3/008; G21B 1/03; G21B 1/19
See application file for complete search history.

(56) References Cited

U.S. PATENT DOCUMENTS

| | | | | |
|---|---|---|---|---|
| 4,328,070 | A | 5/1982 | Friedwardt M. Winterberg | |
| 4,622,969 | A * | 11/1986 | Forssmann .......... | G10K 11/002 601/4 |
| 4,669,472 | A | 6/1987 | Eisenmenger | |
| 4,674,505 | A | 6/1987 | Pauli et al. | |
| 4,718,421 | A * | 1/1988 | Rohwedder ............ | G10K 11/30 310/326 |
| 4,811,725 | A | 3/1989 | Grasser | |
| 4,972,826 | A * | 11/1990 | Koehler ................. | G10K 11/02 601/4 |
| 5,078,149 | A * | 1/1992 | Katsumata ........... | A61B 8/4281 73/644 |
| 5,111,805 | A * | 5/1992 | Jaggy ..................... | G10K 11/02 601/4 |
| 5,371,483 | A * | 12/1994 | Bhardwaj .............. | G10K 11/24 600/459 |
| 5,421,206 | A * | 6/1995 | Rohwedder .......... | G01N 29/343 73/834 |
| 6,361,747 | B1 * | 3/2002 | Dion ........................ | B01J 19/10 366/127 |
| 7,210,355 | B2 * | 5/2007 | Kawabata .............. | G01N 29/28 73/644 |
| 8,257,282 | B2 * | 9/2012 | Uebelacker ...... | A61B 17/22004 601/4 |
| 8,347,723 | B2 * | 1/2013 | Questo ................... | G01N 29/04 73/866.5 |
| 8,776,625 | B2 * | 7/2014 | Questo ..................... | A61N 7/02 73/866.5 |
| 9,530,524 | B2 * | 12/2016 | Ventikos .................. | B01J 19/10 |
| 9,620,247 | B2 * | 4/2017 | Ventikos ................ | G21B 3/006 |
| 9,984,775 | B2 * | 5/2018 | Ventikos ................ | G21B 3/006 |
| 10,155,212 | B2 * | 12/2018 | Hawker ................. | B01J 19/008 |
| 10,265,674 | B2 * | 4/2019 | Ventikos .................. | B01J 19/10 |
| 10,653,193 | B2 | 5/2020 | Markison | |
| 11,800,295 | B2 * | 10/2023 | Kent ...................... | G01N 29/28 |
| 2008/0146971 | A1 | 6/2008 | Uebelacker et al. | |
| 2016/0012921 | A1 | 1/2016 | Ventikos et al. | |

FOREIGN PATENT DOCUMENTS

| | | | | |
|---|---|---|---|---|
| EP | 1354561 | A1 | 10/2003 | |
| GB | 2621188 | A * | 2/2024 | ............. B32B 15/01 |
| GB | 2621189 | A * | 2/2024 | ............... G21B 1/19 |
| GB | 2630107 | A * | 11/2024 | ............... G21B 1/19 |
| JP | 2005241462 | A | 9/2005 | |
| JP | 2013156090 | A | 8/2013 | |
| JP | 2013156098 | A | 8/2013 | |
| WO | 9636969 | A1 | 11/1996 | |
| WO | 03034441 | A1 | 4/2003 | |
| WO | 2011064594 | A2 | 6/2011 | |
| WO | 2011138622 | A1 | 11/2011 | |
| WO | 2014135881 | A1 | 9/2014 | |
| WO | 2024028578 | A1 | 2/2024 | |

OTHER PUBLICATIONS

Examination Report under Section 18(3) for United Kingdom Patent Application No. GB2211489.6 dated Feb. 27, 2023, 5 pages.

Examination Report under Section 18(3) for United Kingdom Patent Application No. GB2211489.6 dated Jul. 6, 2023, 5 pages.

Chapman, Dave, et al., "Investigating the role of transport in uniaxially-driven conical fusion targets," Presentation, 62nd Annual Meeting of the APS Division of Plasma Physics, vol. 65, No. 11, Nov. 9-13, 2020 (17 pages).

Davis, Amanda K., "Laser Ablation and Hydrodynamic Coupling in Direct-Drive Inertial-Confinement-Fusion Experiments," doctoral thesis, Department of Physics and Astronomy, Arts, Sciences and Engineering School of Arts and Sciences, University of Rochester, Rochester, NY, 2017 (211 pages).

Kozyrev, A.S., et al., "Cumulation of Shock Waves in Lamellar Media," Soviet Physics JETP, vol. 29, No. 2, pp. 233-234, Aug. 1969.

Examination Report under Section 18(3) for United Kingdom Patent Application No. GB2211489.6 dated Jul. 5, 2024, 4 pages.

International Search Report (Form PCT/ISA/210), Written Opinion (Form PCT/ISA/237), and Notification of Transmittal of the International Search Report and the Written Opinion of the International Searching Authority (Form PCT/ISA/220) for International Patent Application No. PCT/GB2023/051997 dated Oct. 18, 2023, 21 pages.

Examination Report under Section 18(3) for United Kingdom Patent Application No. GB2211489.6 dated Apr. 5, 2024, 6 pages.

Search Report for Japanese Patent Application No. 2025-505758, dated Dec. 9, 2025, 63 pages.

Notice of Reasons for Refusal for Japanese Patent Application No. 2025-505758, dated Jan. 28, 2026, 10 pages.

* cited by examiner

COMPONENT FOR MANIPULATING AN INPUT SHOCKWAVE

CROSS-REFERENCE TO RELATED APPLICATION(S)

This application claims priority to United Kingdom Patent Application No. GB 2211489.6 filed on Aug. 5, 2022, wherein the entire contents of the foregoing application are hereby incorporated by reference herein.

TECHNICAL FIELD

This invention relates to a component for manipulating an input shockwave, in particular to methods and apparatuses for producing high localized concentrations of energy.

BACKGROUND

It has been shown in WO 2011/138622 that an interaction between a shockwave in a non-gaseous medium and a gaseous medium can generate a high speed transverse jet of the non-gaseous medium that moves through the gaseous medium. This results in the jet impacting on and trapping a volume of the gaseous medium, e.g., against a target, which gives rise to an intense concentration of energy within the gas.

The present invention aims to provide alternative techniques for producing localized energy concentrations.

SUMMARY

When viewed from a first aspect, the invention provides a component for manipulating an input shockwave, wherein the component comprises:

a body comprising a first material;

wherein the body defines a cavity for manipulating the input shockwave so to produce a manipulated shockwave;

wherein the cavity comprises:

an input for receiving the input shockwave incident upon the component; and an output for outputting the manipulated shockwave from the cavity;

and wherein the cavity contains a second material having a shock-impedance that is lower than a shock-impedance of the first material.

The invention thus provides a component that manipulates a shockwave, when the shockwave is input into the component. The component has a body that is shaped to define a cavity. The cavity has an input (e.g., aperture) designed to receive the (input) shockwave that is incident upon the input of the cavity. The cavity is designed (e.g., shaped) to manipulate the shockwave as it passes through the cavity. The cavity also has an output (e.g., aperture) designed to output the manipulated shockwave.

The body may have any suitable and desired dimensions, e.g., to be determined by the specific application of the component. In one embodiment the (e.g., cavity of the) body has a thickness, diameter and/or maximum dimension between 0.1 mm and 100 mm, e.g., between 1 mm and 50 mm, e.g., between 2 mm and 10 mm, e.g., approximately 3 mm, 5 mm or 8 mm.

The body, which is made from a first material, defines the cavity within the body. The cavity, e.g., a volume defined by and within the body, is thus preferably surrounded by the body (e.g., other than the input and the output).

The body is formed from (comprises, e.g., consists of) a first material. The cavity contains (e.g., is at least partially filled with) a second material. The second material has a shock-impedance that is lower than a shock-impedance of the first material. Thus the (shape of the) cavity is defined by the (e.g., internal walls of the) body (formed from the first material) and the second material is located within the volume of the cavity. Preferably the second material is between the input and the output of the cavity. Thus, the body comprises a material having a higher shock-impedance than the (second) material of, or contained in, (e.g., at least some of) the cavity.

Thus it will be seen that, in embodiments, the component can be used to manipulate (e.g., modify the shape and/or intensity of) an input shockwave, owing to the (e.g., shape of the) cavity and the difference in shock-impedance of the first and second materials. As such, the shockwave transmitted from the output of the cavity may have a greater (e.g., energy) intensity than the input shockwave received at the input of the cavity.

Furthermore, the component may help to manipulate the input shockwave in a way that helps to prevent or delay the jetting of material that is experienced with the apparatus and method disclosed in WO 2011/138622, e.g., owing to the shape of the cavity and/or the presence of the second material within the cavity. This may help to amplify (e.g., concentrate the intensity of) the input shockwave, e.g., before it is used to cause an impact against a target, thus helping to increase the concentration of energy generated by the impact.

The component may therefore be used with the apparatus and method disclosed in WO 2011/138622, e.g., to amplify (e.g., concentrate the intensity of) the input shockwave, before the amplified shockwave is used as the input shockwave for the apparatus and method disclosed in WO 2011/138622.

The body may comprise (e.g., (internal) walls having) any suitable and desired shape to define the cavity. Preferably the body has dimensions (e.g., lateral dimensions, in directions substantially perpendicular to the direction between the input and the output) that are (e.g., substantially, e.g., significantly) greater than the (e.g., lateral) dimensions of the cavity. Thus, preferably, the walls of the body are thicker than one or more (e.g., all) of the dimensions (e.g., than the width (e.g., diameter) of the input, e.g., than the width (e.g., diameter) of the output, e.g., than the maximum dimension) of the cavity. This helps to control the boundary conditions of the shockwave as it passes through the cavity.

In embodiments, the body (and thus the cavity) is shaped such that the input has a cross-sectional area that is greater than the (e.g., corresponding) cross-sectional area of the output. The cross-sectional area of the input and/or the output may be defined in a plane substantially perpendicular to a direction between the input and the output, e.g., such that the cross-sectional area of the input is substantially parallel to the cross-sectional area of the output, e.g., the (plane of the) input aperture is substantially parallel to the (plane of the) output aperture. The direction between the input and the output may be substantially parallel to the direction in which, in embodiments of the invention, the input shockwave is arranged to be propagated to be incident upon the component.

In embodiments, the body (and thus the cavity) may be shaped such that the cross-sectional area of the cavity in a plane substantially perpendicular to the direction between the input and the output may decrease linearly or non-linearity. In embodiments, the cross-sectional area of the cavity may initially increase when moving from the input towards the output, and then decrease. In embodiments, the cross-sectional area of the output may be greater than the cross-sectional area of the input (e.g., the cavity may have a flared output). Thus, for example, the cross-sectional area of the cavity may initially decrease when moving from the input towards the output, and then increase.

In embodiments, the (e.g., a section of the) cavity comprises a frustum, e.g., the body is shaped to define a frustum-shaped cavity. Thus preferably a cross section of the cavity (e.g., in a plane parallel to the direction between the input and the output) comprises straight sides (walls) and, e.g., the cross-section is symmetrical (in that plane).

The frustum may comprise any suitable and desired type of frustum. In embodiments, the cavity comprises a conic frustum. Thus preferably the cavity is rotationally symmetric about an axis through the cavity. Preferably the axis of the body or cavity is parallel to the direction between the input and the output.

In embodiments, the (cross section and/or walls of the) cavity comprises two or more sections (e.g., sub-cavities) that are at different respective angles to the axis of the cavity (e.g., the axis about which the cavity is rotationally symmetric, e.g., parallel to the direction between the input and the output). Thus, for example, the cavity may comprise two or more frustums (e.g., with the output of one frustum coinciding with the input of the other frustum, for each pair of successive frustums), wherein the two or more frustums have side walls having different respective angles to the axis of the cavity. Providing different angles for the cavity sections may help to manipulate the input shockwave in a particular manner, e.g., to accelerate the input shockwave from the input to the output.

In embodiments in which the cavity has three or more frustum sections, each section may be at a different angle to each of the other sections; however, two or more of the sections may be at the same angle, with one or more intermediate sections of the cavity at a different angle.

In embodiments, instead of or in addition to the cavity having one or more straight-sided sections (in cross section), the cavity may have a cross section having one or more sections having curved walls. For example, the cavity may comprise a flared (e.g., conic) frustum wherein the cavity walls are (e.g., elliptically) curved. These types of shapes may help to provide greater uniformity of the shock front, and/or of the shock shape, at the output.

In embodiments, the component comprises one or more impedance matching layers. Impedance matching layers help to couple energy between different layers of material. The impedance matching layer may comprise a (intermediate) layer of material provided between two other (different) materials, wherein the impedance matching layer is formed from a material having a shock-impedance that is between the shock-impedance of the two other materials.

For example, a layer of copper may be provided between layers of aluminium and tantalum. In embodiments, impedance matching layers may comprise a plurality of materials which are arranged in (e.g., parallel) layers such that the shock-impedance changes (e.g., incrementally) between layers.

In embodiments, the component comprises an input impedance matching layer adjacent to (e.g., extending across) the (e.g., aperture of the) input of the cavity. The input impedance matching layer helps to improve the transmittal of energy (e.g., from an incident projectile) into the second material, by helping to reduce the reflected component of the input shockwave, e.g., from the surface of the second material. Thus, the input impedance matching layer may help to couple the input shockwave into the cavity.

In embodiments, the input impedance matching layer comprises a planar layer. The input impedance matching layer may comprise (e.g., consist of) a material having a shock-impedance that is greater than the shock-impedance of the second material, e.g., having a shock-impedance that is less than the first material, e.g., having a shock-impedance between the shock-impedance of the first material and the shock-impedance of the second material.

In embodiments, the shock-impedance of the input impedance matching layer is between the shock-impedance of (the material of) an impacting projectile configured to generate the input shockwave (e.g., when impacting on the component) and the material of the second material.

In embodiments, the component comprises an output impedance matching layer adjacent to (e.g., extending across) the (e.g., aperture of the) output of the cavity. The output impedance matching layer helps to improve the transmittal of energy from the (e.g., second material of the) cavity, by helping to reduce the reflected component of the shockwave as the shockwave is output from the cavity, e.g., from the output surface of the second material. Thus, the output impedance matching layer may help to couple the input shockwave out of the cavity.

In embodiments, the output impedance matching layer comprises a planar layer. The output impedance matching layer may comprise (e.g., consist of) a material having a shock-impedance that is less than the shock-impedance of the second material, e.g., having a shock-impedance that is greater than a (e.g., fuel or target) material upon which the output shockwave is to be incident, e.g., having a shock-impedance between the shock-impedance of the second material and the shock-impedance of a (e.g., fuel or target) material upon which the output shockwave is to be incident. In embodiments, the output impedance layer comprises polymethylpentene, e.g., TPX®.

In embodiments, the cavity is partially filled with the second material, i.e., the second material does not (fully) fill the cavity. Thus, in embodiments, the cavity comprises a spacing between the input of the cavity and (an input surface of) the second material. Depending on the size and/or shape of an incident projectile, which may be used to generate the input shockwave, providing a gap in the cavity between the input (e.g., aperture) and the second material may allow the projectile to impact the (e.g., walls of the cavity of the) body of the component directly, e.g., before impacting the second material. This may generate a lateral shockwave inside the projectile that may then be transferred into the cavity.

The lateral shockwave inside the projectile may help to provide transverse focusing within the projectile. This in turn has the effect that the shockwave which is transferred into the cavity is focused more towards the central axis of the cavity.

This is considered to be novel and inventive in its own right and thus, when viewed from a further aspect, the invention provides a component for manipulating an input shockwave, wherein the component comprises:

- a body comprising a first material;
  - wherein the body defines a cavity for manipulating the input shockwave so to produce a manipulated shockwave;
    - wherein the cavity comprises:
      - an input for receiving the input shockwave incident upon the component; and an output for outputting the manipulated shockwave from the cavity;

wherein the cavity contains a second material having a shock-impedance that is lower than a shock-impedance of the first material; and wherein the cavity comprises a spacing between the input of the cavity and an input surface of the second material.

It will be appreciated that this aspect may (and preferably does) include one or more (e.g., all) of the preferred and optional features disclosed herein, e.g., relating to other aspects and embodiments of the invention, as applicable.

The spacing between the input of the cavity and the (input surface of) the second material may be filled with any suitable and desired material. In one embodiment the spacing comprises a vacuum. In one embodiment the spacing is filled with a gas. The gas may comprise any suitable and desired gas.

In embodiments, the cavity contains a plurality of (e.g., parallel) layers, wherein one or more of the plurality of layers comprises (e.g., consists of) the second material. Preferably the layers are parallel to the input and/or output (e.g., apertures) of the cavity, e.g., perpendicular to the direction between the input and the output. Thus, the layers are preferably perpendicular to the direction along which the input shockwave is arranged to be propagated to be incident upon the component.

Providing multiple layers helps to superimpose components of the input shockwave that are reflected from the boundaries between the layers. This helps to amplify the intensity of the shockwave between the input and the output of the cavity.

This is considered to be novel and inventive in its own right and thus, when viewed from a further aspect the invention provides a component for manipulating an input shockwave, wherein the component comprises:

a body comprising a first material;

wherein the body defines a cavity for manipulating the input shockwave so to produce a manipulated shockwave;

wherein the cavity comprises:

an input for receiving the input shockwave incident upon the component;

an output for outputting the manipulated shockwave from the cavity; and a plurality of (e.g., parallel) layers between the input and the output;

wherein the plurality of layers comprises one or more layers comprising a second material having a shock-impedance that is lower than a shock-impedance of the first material.

It will be appreciated that this aspect may (and preferably does) include one or more (e.g., all) of the preferred and optional features disclosed herein, e.g., relating to other aspects and embodiments of the invention, as applicable. Thus, for example, preferably the layers are parallel to the input and/or output (e.g., apertures) of the cavity, e.g., perpendicular to the direction between the input and the output. Preferably the body is shaped such that a cross-sectional area of the input is greater than a cross-sectional area of the output.

In embodiments, the plurality of layers comprises at least one first layer and at least one second layer. Preferably the at least one first layer comprises (e.g., consists of) a third material, and the at least one second layer comprises (e.g., consists of) the second material. In embodiments, the third material has a higher shock-impedance than the shock-impedance of the second material.

In embodiments, the plurality of layers comprises at least one third layer, wherein the at least one third layer comprises (e.g., consists of) a fourth material. In embodiments, the fourth material has a higher shock-impedance than the third material which has a higher shock-impedance than the second material.

In embodiments, the plurality of layers comprises a plurality of first, second, and third layers. In embodiments, the plurality of layers comprises a repeating pattern of first, second and third layers.

In embodiments, the third material is the (same material as the) first material. Thus, in these embodiments the plurality of layers comprises at least one first layer and at least one second layer, wherein the at least one first layer comprises (e.g., consists of) the first material, and the at least one second layer comprises (e.g., consists of) the second material.

In embodiments, the second material may be a solid, a liquid, or a gas. In embodiments, one or more of the second layers is a vacuum.

In embodiments, the plurality of layers comprises a plurality of first layers and/or a plurality of second layers. Preferably the plurality of layers alternate between the first layers and the second layers, e.g., (each of one or more of) the first layer(s) is adjacent (sandwiched between) two second layers and/or (each of one or more of) the second layer(s) adjacent (sandwiched between) two first layers.

In the embodiments in which the plurality of layers comprises a plurality of first layers and/or a plurality of second layers, each of the first layers may comprise (e.g., consist of) the same (e.g., third) material and/or each of the second layers may comprise (e.g., consist of) the same (e.g., second) material. However, in some embodiments, one or more of the plurality of first layers may comprise (e.g., consist of) a material that is different to the third material and/or one or more of the plurality of second layers may comprise (e.g., consist of) a material that is different to the second material.

In embodiments, one or more of the first layers and/or the second layers comprise compound layers, i.e., the layers (e.g., each) comprise a plurality of sub-layers. The sub-layers may be formed of different materials (e.g., materials which are different to the other sub-layers and/or materials which are different to the second material and/or third material).

The plurality of layers could have any suitable and desired thickness (the dimension perpendicular to the plane in which the layers extend and are parallel). For example, each of the plurality of layers has the same thickness. In embodiments, the plurality of layers (e.g., each) have different thicknesses. In embodiments in which the plurality of layers comprises at least one first layer and at least one second layer, preferably one or more (e.g., all) of the at least one second layer (e.g., each) has a thickness that is greater than the thickness of (e.g., each of) one or more (e.g., all) of the at least one first layer.

In embodiments in which the plurality of layers comprises a plurality of first layers and/or a plurality of second layers, each of the plurality of first layers may have the same thickness and/or each of the plurality of second layers may have the same thickness, preferably with the plurality of second layers (e.g., each) having a thickness greater than the thickness of (e.g., each of) the plurality of first layers. In embodiments, the thicknesses of the plurality of first layers varies between the first layers. In embodiments, the thicknesses of the plurality of second layers varies between the second layers. In embodiments, the thicknesses of the plurality of first layers decrease (e.g., progressively) from the input to the output. In embodiments, the thicknesses of the plurality of second layers decrease (e.g., progressively) from the input to the output.

In embodiments, the second material may extend across (e.g., fill) the (width of the) cavity, i.e., in a direction perpendicular to the direction from the input to the output.

In embodiments, when the cavity contains a plurality of layers, one or more (e.g., all) of the layers extends across the (width of the) cavity (i.e., in the plane of the layer, in a direction perpendicular to the direction from the input to the output). For example, one or more (e.g., all) of the first layer(s) and/or one or more (e.g., all) of the second layer(s) may extend across the cavity.

In embodiments, the cavity comprises a gap between the second material and the body of the component, i.e., between the second material and the wall(s) of the cavity. Thus, the second material may be spaced from the body of the component, i.e., from the wall(s) of the cavity.

In embodiments, when the cavity contains a plurality of layers, one or more (e.g., all) of the layers is spaced from the body of the component, i.e., from the wall(s) of the cavity. In embodiments, the cavity comprises a gap between the plurality of layers and the body of the component, i.e., between the plurality of layers and the wall(s) of the cavity. Thus, in these embodiments, all of the plurality of layers are spaced from the body of the component.

When the cavity comprises a gap adjacent the wall(s) of the cavity, the gap may be filled (e.g., comprise or consist of) a vacuum. In embodiments, the gap comprises a buffer layer (e.g., comprising (e.g., consisting of) a fourth material) adjacent the walls of the cavity. Thus the (walls of the) cavity may be lined with the buffer layer. Similarly, the fourth material may be located between the second material and the body of the component and/or between one or more of the plurality of layers and the body of the component.

The gap and/or the buffer layer may help to reflect shockwaves from the cavity wall, reducing coupling of the shockwave into the body of the component and, e.g., instead focusing the shockwave towards the output of the cavity.

Preferably the fourth material has a lower shock-impedance than that of the first material. In embodiments, the fourth material has a shock-impedance which is between that of the first material and that of the second material.

In embodiments, the gap or the buffer layer has a constant thickness (in a direction perpendicular to the wall(s) of the cavity). In embodiments, the gap or the buffer layer has a variable thickness. For example, the thickness of the buffer layer may change (e.g., increase or decrease) from the input to the output of the cavity.

The various materials discussed herein (i.e., including the first and second materials) may comprise any suitable and desired materials. In embodiments, the first material comprises (e.g., consists of) a solid. In embodiments, the first material comprises (e.g., consists of) a heavy (e.g., transition) metal, e.g., tantalum, platinum, steel, copper or tungsten.

In embodiments the second material comprises (e.g., consists of) a solid. In embodiments, the second material comprises (e.g., consists of) a polymer, e.g., a thermopolymer, e.g., polymethyl methacrylate (PMMA). In embodiments, the second material comprises (e.g., consists of) a liquid, e.g., water, ethanol or oil. In embodiments in which the plurality of layers comprises a plurality of second layers, one or more of the plurality of second layers may comprise (e.g., consists of) a gas or a vacuum.

In embodiments, the cavity comprises a first sub-cavity and a second sub-cavity (each) arranged between the input of the cavity and the output of the cavity, wherein the first sub-cavity comprises an input and an output, and the second sub-cavity comprises an input and an output, wherein the output of the first sub-cavity is coupled to the input of the second sub-cavity. Thus, the cavity may be shaped to have two (or more) sub-cavities, with the first sub-cavity arranged proximal to the input of the cavity and the second sub-cavity arranged proximal to the output of the cavity.

This is considered to be novel and inventive in its own right and thus, when viewed from a further aspect, the invention provides a component for manipulating an input shockwave, wherein the component comprises:

- a body comprising a first material;
  - wherein the body defines a cavity for manipulating the input shockwave so to produce a manipulated shockwave;
  - wherein the cavity comprises:
    - an input for receiving the input shockwave incident upon the component;
    - an output for outputting the manipulated shockwave from the cavity;
    - a first sub-cavity and a second sub-cavity arranged between the input of the cavity and the output of the cavity;
    - wherein the first sub-cavity comprises an input and an output, and the second sub-cavity comprises an input and an output;
    - wherein the output of the first sub-cavity is coupled to the input of the second sub-cavity.

It will be appreciated that this aspect may (and preferably does) include one or more (e.g., all) of the preferred and optional features disclosed herein, e.g., relating to other aspects and embodiments of the invention, as applicable.

In embodiments, the body is shaped such that a cross-sectional area of the output of the first sub-cavity may be different (e.g., a different size) to the cross-sectional area of the input of the second sub-cavity. For example, the cross-sectional area of the output of the first sub-cavity may be greater than the cross-sectional area of the input of the second sub-cavity.

In preferred embodiments, however, the body is shaped such that a cross-sectional area of the output of the first sub-cavity is less than a cross-sectional area of the input of the second sub-cavity. Shaping the cavity in this way to provide multiple sub-cavities helps to at least partially recapture the manipulated shockwave that is output from one (e.g., the first) sub-cavity by the input of the subsequent (e.g., the second) sub-cavity. This may enable the shockwave to then be further manipulated by (e.g., focused in) the subsequent sub-cavity. This may help to reduce the energy of the input shockwave that is lost into the body of the component and thus help to increase the energy that is transmitted in the manipulated shockwave that is output from the cavity.

Preferably the input of the first sub-cavity has a cross-sectional area that is greater than a cross-sectional area of the output of the first sub-cavity. Preferably the input of the second sub-cavity has a cross-sectional area that is greater than a cross-sectional area of the output of the second sub-cavity. In this way, both of the sub-cavities have a cross-sectional area that decreases from the respective input to the output, with the cross-sectional area increasing from the output of the first sub-cavity to the input of the second sub-cavity.

In embodiments, the cavity comprises a plurality of sub-cavities, wherein each sub-cavity comprises an input and an output, wherein the output of each sub-cavity (apart from the output of the sub-cavity proximal to the output of the cavity) is coupled to the input of the subsequent sub-cavity (in a direction from the input to the output of the cavity), wherein the body is shaped such that a cross-sectional area of the output of the each sub-cavity (apart from the output of the sub-cavity proximal to the output of the cavity) is less than a cross-sectional area of the input of the subsequent sub-cavity.

Thus, preferably the cavity has multiple linked sub-cavities from the input of the cavity to the output of the cavity, along the direction between the input of the cavity to the output of the cavity. Preferably the output of each (e.g., the first) sub-cavity is completely overlapping with (falls within) the input of the subsequent (e.g., the second) sub-cavity. Thus, in embodiments, the wall(s) of the cavity comprise portions that project inwards to define the (inputs and outputs of the) sub-cavities.

In embodiments, the cavity comprises a (e.g., first) layer between the first and second sub-cavities, e.g., the (e.g., first) layer extends across the output of the first sub-cavity. When there are a plurality of sub-cavities, the cavity may comprise a first layer between (e.g., each of) the adjacent sub-cavities. Separating the sub-cavities with a first layer may help to couple the shockwave between the sub-cavities.

The features outlined herein relating to the cavity may, as applicable, apply to (e.g., each of) the sub-cavities. In particular, one or more (e.g., all) of the sub-cavities may contain (e.g., be at least partially filled with) a material (e.g., the second material), having a shock-impedance that is lower than a shock-impedance of the first material. When provided, the (e.g., first) layer(s) may be formed (e.g., comprise or consist) of a material (e.g., the first or third material) having a higher shock-impedance than the shock-impedance of the (e.g., adjacent) sub-cavities (e.g., the second material).

When viewed from a further aspect, the invention provides a component for manipulating an input shockwave, wherein the component comprises:

- an input face for receiving the input shockwave incident upon the component;
- an output face for outputting the manipulated shockwave from the component; and
- a plurality of (e.g., parallel) layers between the input face and the output face.

It will be appreciated that this aspect may (and preferably does) include one or more (e.g., all) of the preferred and optional features disclosed herein, e.g., relating to other aspects and embodiments of the invention, as applicable. For example, one or more (e.g., all) of the preferred and optional features outlined herein relating to the plurality of layers may apply equally to this aspect of the invention.

When viewed from a further aspect, the invention provides a method of manipulating a shockwave, the method comprising generating at least one shockwave to be incident upon a component according to any one of the aspects or embodiments described herein.

It will be appreciated that this aspect may (and preferably does) include one or more (e.g., all) of the preferred and optional features disclosed herein, e.g., relating to other aspects and embodiments of the invention, as applicable. For example, preferably the shockwave is arranged to be incident upon (e.g., generated at) the input of the component. Preferably the shockwave comprises a planar shockwave. Preferably the shockwave is arranged to propagate along a direction parallel to the direction between the input and the output of the component. Thus, preferably the shockwave is arranged to be incident upon (e.g., generated at) the input of the component in a plane parallel to a plane of the input of the component (e.g., in the plane of the input).

The component may manipulate the shockwave for any suitable and desired use. In some embodiments, the component comprises a component for manipulating (e.g., amplifying) an input shockwave to (e.g., output a manipulated shockwave to) generate a localized concentration of energy for initiating a nuclear fusion reaction.

When viewed from a further aspect, the invention provides a system for producing a localized concentration of energy comprising:

- a component according any one of the aspects or embodiments described herein; and
- a mechanism for generating at least one shockwave propagating through the component.

It will be appreciated that this aspect may (and preferably does) include one or more (e.g., all) of the preferred and optional features disclosed herein, e.g., relating to other aspects and embodiments of the invention, as applicable.

In embodiments, the mechanism for generating a shockwave comprises a mechanism configured to drive a projectile into the component.

In embodiments, the mechanism for generating a shockwave comprises an explosively driven mechanism, such as a gas gun, configured to drive the projectile into the component.

In embodiments, the mechanism for generating a shockwave comprises an electromagnetic mechanism, such as a pulsed power machine magnetically driven plate flyer, configured to drive the projectile into the component.

In embodiments, the (e.g., electromagnetic) mechanism for generating a shockwave comprises a direct drive mechanism configured to generate a Lorentz force in an electrode adjacent the component. In such embodiments, the Lorentz force generates a shockwave in the electrode which is transmitted to the input of the component.

In embodiments, the mechanism for generating a shockwave comprises a laser drive mechanism. The mechanism may comprise an ablator layer adjacent the input of the component and one or more lasers configured to ablate the ablator layer creating a shockwave in the component. In embodiments, the lasers are incident directly on the ablator layer. In embodiments, the lasers are incident on a hohlraum surface, creating x-rays which bathe the ablator material causing it to ablate.

Furthermore, it will be appreciated that one or more (e.g., all) of the embodiments described herein may be combined with each other (in any appropriate combination), as applicable, to provide further embodiments.

It will be understood that where used herein, the term "shock-impedance" is intended to mean "the pressure which must be applied to a medium in order to impart a unit particle velocity to some of the medium" (Henderson, 'On the refraction of shock waves', Journal of Fluid Mechanics, Volume 198, January 1989, pages 365-386). This is equal to the product of the shock speed and the density of the un-shocked material.

It will be understood that the input shockwave may be formed outside of the cavity, and propagate into the input of the cavity, but may additionally or alternatively be generated in the component, for example by the component being struck (e.g., by a projectile). Both alternatives are covered by the wording "input shockwave".

BRIEF DESCRIPTION OF DRAWINGS

Certain embodiments of the invention will now be described, by way of example only, with reference to the accompanying drawings, in which.

DETAILED DESCRIPTION

Components for producing localized energy concentrations from an input shockwave will now be described.

Figure 1:
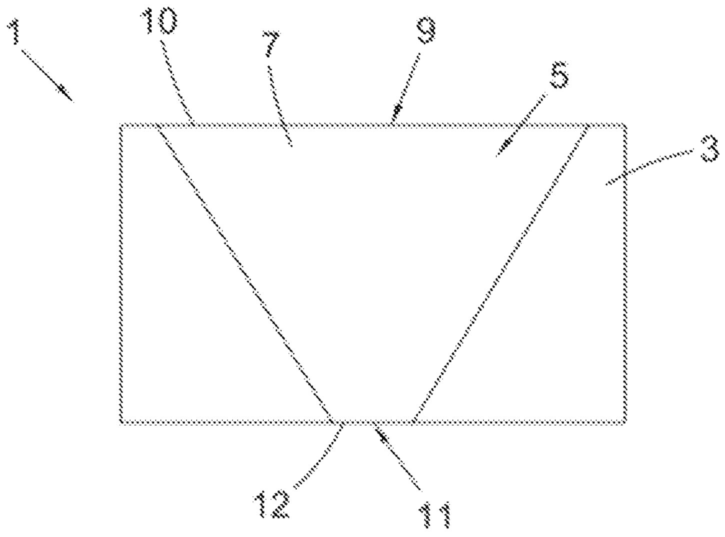
FIG. 1 shows a component in accordance with one embodiment of the invention.

FIG. 1 shows a cross section through a component 1 in accordance with one embodiment of the invention. The component 1 comprises a body 3 that defines a hollow frustum shaped cavity 5. The body 3 is formed of a material having a high shock-impedance. In an exemplary embodiment, the body 3 is formed of tantalum. The body may be formed of other materials, for example other heavy metals, e.g., tungsten, steel, copper or platinum.

The cavity 5 contains a material 7 having a low shock-impedance. The cavity fill material 7 has a lower shock-impedance than that of the body 3. In an exemplary embodiment, the cavity fill material 7 is polymethyl methacrylate (PMMA).

The cavity 5 has an input aperture 9 that is configured to receive a shockwave, and an output aperture 11 that is configured to output the shockwave after the shockwave has propagated through the component 1. The cross-sectional area of the input aperture 9 is greater than that of the output aperture 11.

FIG. 1 shows a cross section through the component, in a plane containing a longitudinal axis of the component, the longitudinal axis extending perpendicularly between the plane of the input aperture 9 and the plane of the output aperture 11.

In the illustrated embodiment, the component 1 is rotationally symmetrical about the longitudinal axis. It will therefore be understood that the cavity 5 of the component 1 is shaped as a conic frustum with an input radius greater than the output radius. The component 1 has an input face 10 which is proximal to the input 9 of the cavity 5, and an output face 12 which is proximal to the output 11 of the cavity 5.

Figure 2:
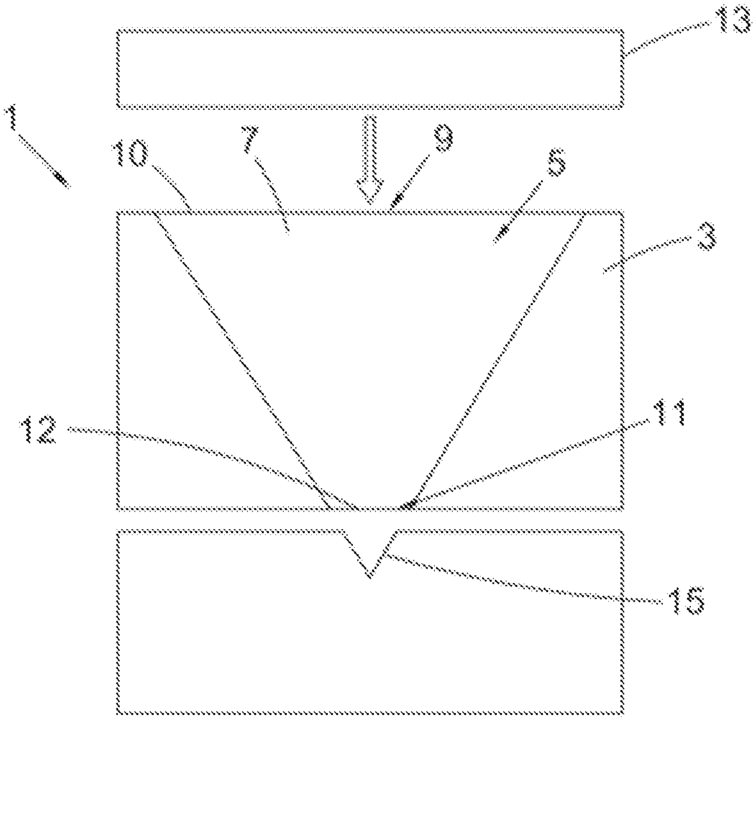
FIG. 2 shows a system incorporating the component of FIG. 1.

Operation of the component 1 will now be explained with reference to FIG. 2. The input 9 is configured to receive a shockwave. In the embodiment shown in FIG. 2, this shockwave is generated by striking the input face 10 of the component 1 with a diskshaped projectile 13. This strike generates a planar shockwave in the component 1 which is focused by the component 1 onto a target 15, creating a localized concentration of energy at the location of the target 15.

Figure 3A:
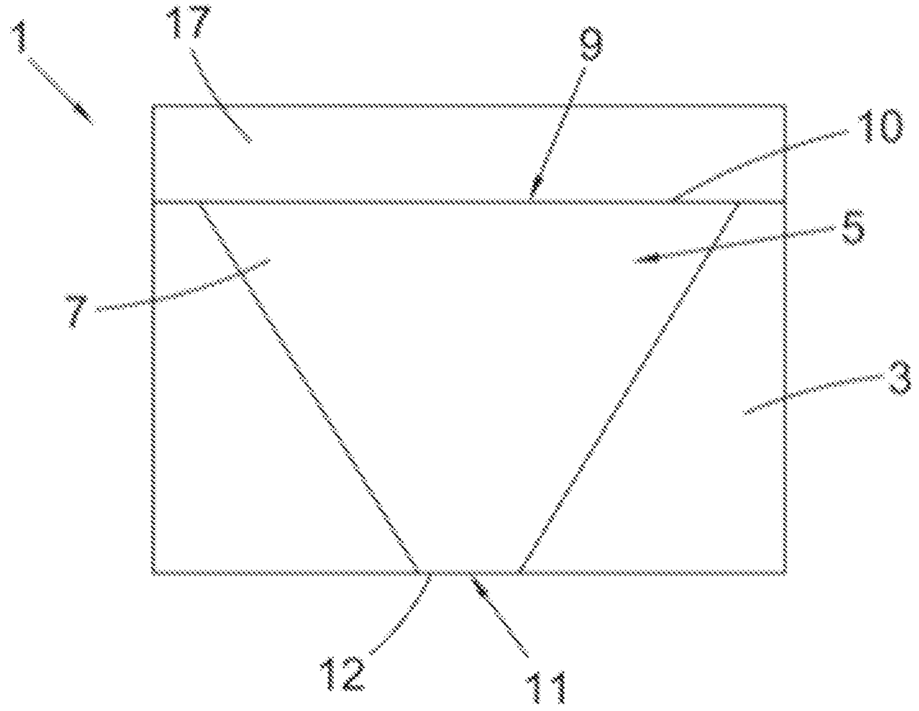
FIGS. 3*a* and 3*b* show variants of the embodiment of FIG. 1 comprising impedance matching layers.

FIG. 3*a* shows an embodiment of the component 1 having an impedance matching layer 17 provided on the input face 10 of the component 1. The impedance matching layer 17 is a planar layer of material having a shock-impedance which is between that of the projectile 13, and that of the cavity fill material 7. The impedance matching layer 17 improves the coupling efficiency into the component 1 such that a higher proportion of the energy input into the component 1 by the projectile 13 is transmitted into the cavity fill material 7.

In embodiments, the impedance matching layer 17 may be formed of a material having a variable shock-impedance, such as a high impedance foam. The first shock will encounter a relatively low impedance material, but will compress the foam such that aftershocks then encounter a compressed, and hence high-impedance material. Such an impedance matching layer 17 may allow a low-impedance projectile 13 to be used since the low-impedance projectile may effectively couple to the foam.

Figure 3B:
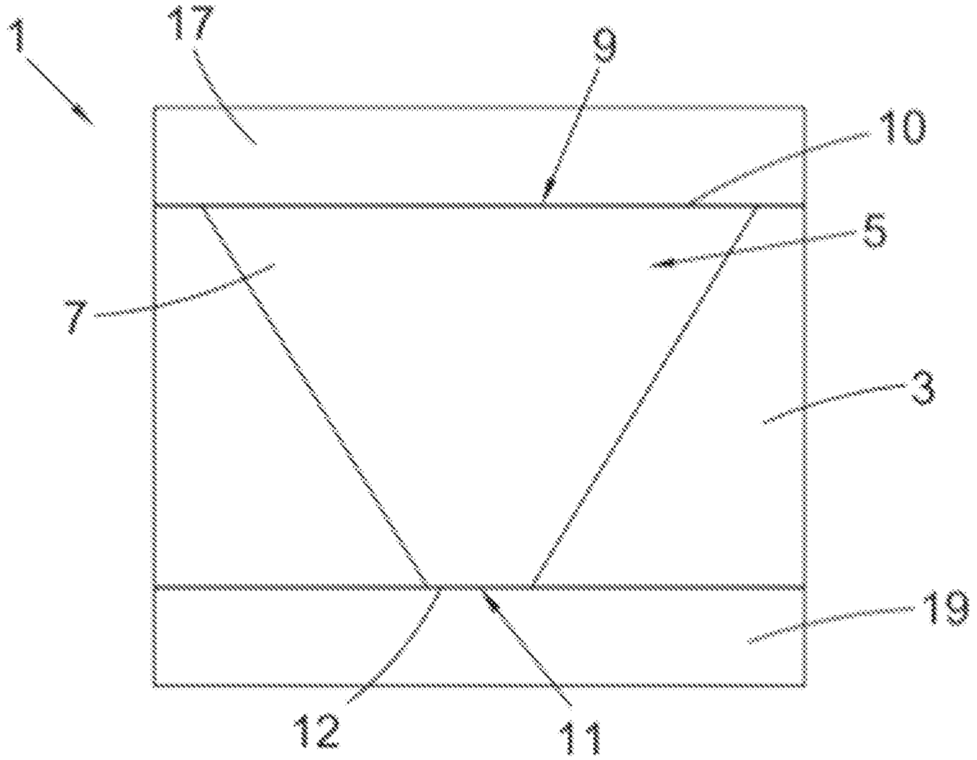

FIG. 3*b* shows an embodiment of the component 1 having both a first impedance matching layer 17 provided on the input face 10 of the component 1, and a second impedance matching layer 19 provided on the output face 12 of the component 1. The second impedance matching layer 19 is a planar layer of material having a shock-impedance which is between that of the cavity fill material 7, and that of the target 15. In embodiments, the second impedance matching layer 19 is formed of polymethylpentene, e.g., TPX®.

Figure 4A:
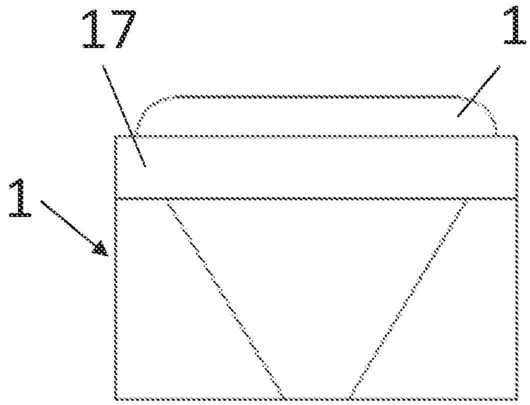
FIGS. 4*a-f* show six successive stages of an interaction of a shockwave with the component shown in FIG. 3*a;*
Figure 4B:
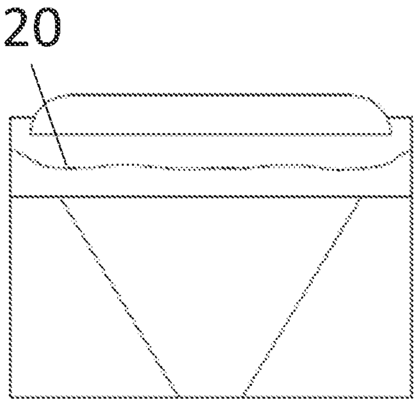
Figure 4C:
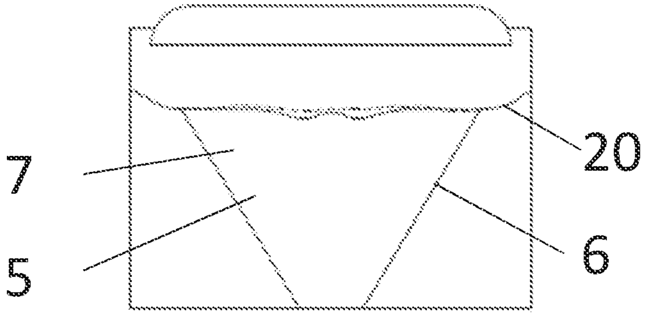

Operation of the component 1 will now be further explained with reference to FIGS. 4*a-e*. FIGS. 4*a-e* show a projectile 13 striking the component 1 shown in FIG. 4*a*. FIG. 4*a* shows the projectile 13 striking the impedance matching layer 17. At FIGS. 4*b*, and 4*c*, a resulting shockwave 20 passes through the impedance matching layer 17, and enters the cavity fill material 7. Pressures are increased in the component 1 through shockwave reflection and superposition within the cavity 5.

Figure 4D:
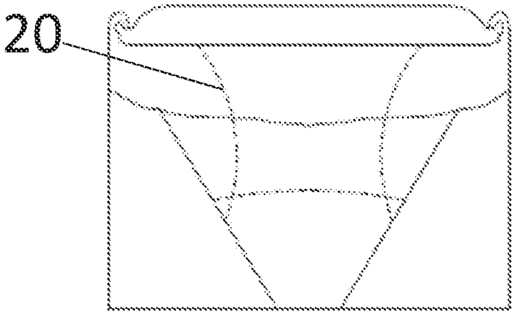
Figure 4E:
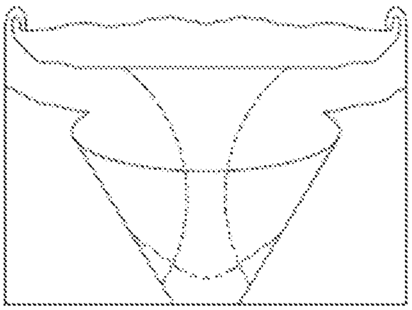
Figure 4F:
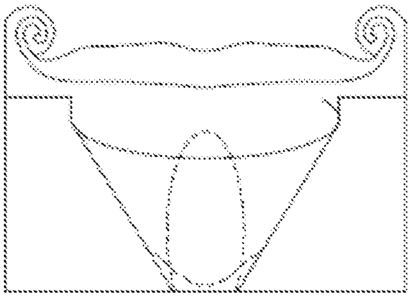

On input into the cavity 5, the input shock reflects from the cavity walls 6, as seen in FIG. 4*d*, as an irregular shock reflection (Mach reflection), that propagates in from the cavity walls 6, eventually overlapping on the central axis of the cavity 5 as shown in FIG. 4*e* and FIG. 4*f*. The overlap of this radially-symmetric wave on the central axis creates a high pressure point within the cavity fill material 7, which expands and interacts with the impinging Mach reflection, leading to the generation of an axial, quasi-planar Mach stem that propagates towards the output 11 of the cavity 5. This wave eventually reaches the output 11 of the cavity 5 and emerges from the component 1 with a higher pressure than that of the original input shockwave 20.

In simulations, a component in line with the embodiment of FIG. 1 achieved a pressure multiplication factor of 8.5, with an input shockwave having a pressure of 74 GPa, and an output shockwave having a pressure of 630 GPa.

Figure 5:
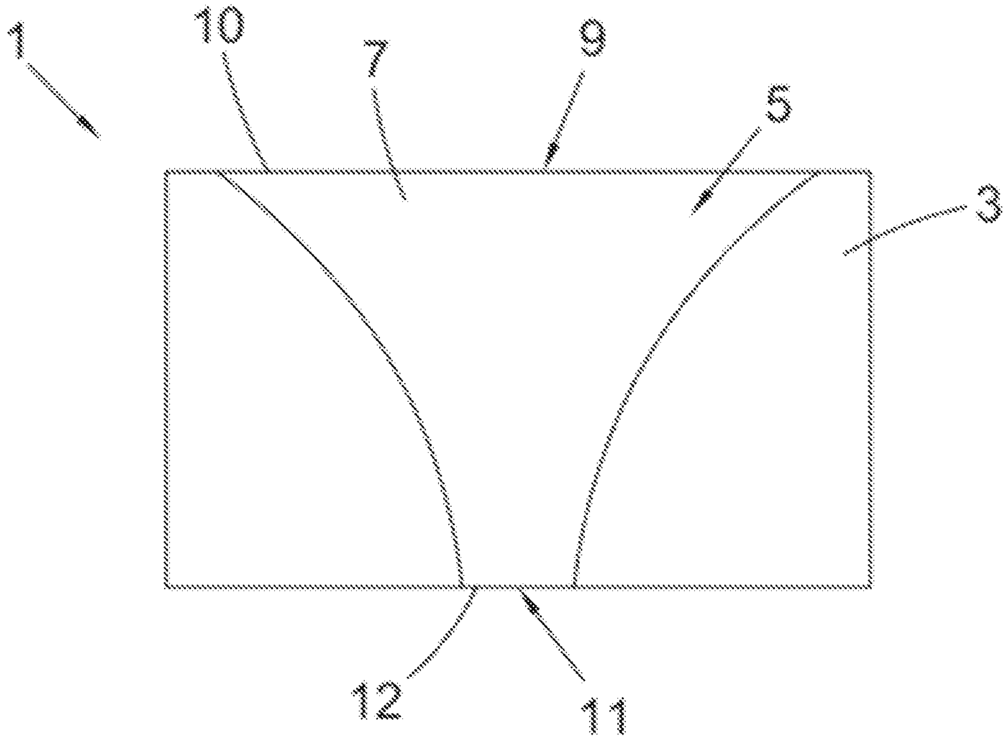
FIG. 5 shows a variant of the embodiment of FIG. 1.

FIG. 5 shows a variant of the embodiment shown in FIG. 1 in which the cavity 5 has the shape of a flared conic frustum, with a cavity wall 6 which is elliptically curved. Other than the cavity shape, the structure of the component 1 is as described above in relation to FIG. 1. This different shape may alter the output shock profile and shock state, but the basic function of the cavity 5 is as described above in relation to FIGS. 4*a-e*.

Figure 6:
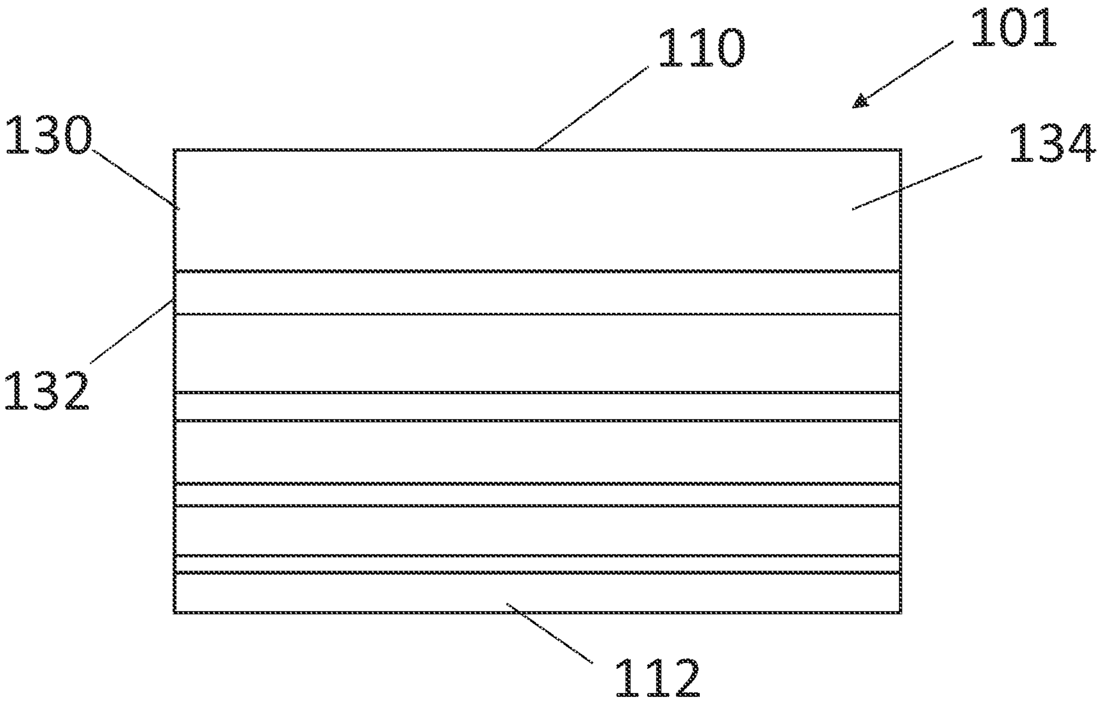
FIG. 6 shows a component in accordance with another embodiment of the invention.

FIG. 6 shows a component 101 according to another embodiment of the invention. The component 101 comprises a body 103 formed of a series of parallel layers. The layers comprise low shock-impedance layers 130 formed of a low shock-impedance material such as PMMA or epoxy resin, and high shock-impedance layers 132 formed of a high shock-impedance material such as tantalum, platinum, tungsten, steel, copper, or other (e.g., heavy) metals. As a minimum requirement, the high shock-impedance layers 132 is formed of a material having a higher shock-impedance than the material forming the low shock-impedance layers. In preferred embodiments, the ratio of the shock-impedance of the high shock-impedance layers to the shock-impedance of the low shock-impedance layers is high such that there is a large shock-impedance difference at the boundary between layers.

The parallel layers alternate from low shock-impedance layers 130 to high shock-impedance layers 132 from one layer to the next. In the illustrated embodiment, an input layer 134 which forms the input face 110 of the component 101 is a low shock-impedance layer 130. This is because an input face 110 formed from a high shock-impedance layer 132 would result in a larger portion of the shockwave being reflected by the input face 110, and hence not transmitted into the component 101. The alternative is however envisaged, and an input face 110 formed from a high shock-impedance layer 132 may help to better couple the shock into the component 101 since a high shock-impedance layer may have a more similar shock-impedance to that of a projectile 13 striking the component.

In the illustrated embodiment, the high shock-impedance layers 132 are each of equal thickness, whilst the low shock-impedance layers have thicknesses that decrease progressively from the input face 110 to the output face 112. In embodiments however, the thicknesses of the high shock-impedance layers 132 may also decrease progressively from the input face 110 to the output face. It will be understood that although the thickness may vary between layers, each individual layer has a uniform thickness across its width.

The layers are arranged such that shockwaves generated at the input face 110 of the component 101 of the layer stack reverberate within the stack of layers, as a result of reflections from the boundaries between low and high shock-impedance layers 130, 132, leading to regions of constructive and destructive interference as shock waves pass over one another. When a shock passes from a low shock-impedance layer 130 into a high shock-impedance layer 132, a portion of the shock is transmitted into the high shock-impedance layer 132 whilst a portion is reflected back into the low shock-impedance layer 130.

The portion in the low shock-impedance layer 130 speeds up since it is now travelling through pre-shocked material, the shock portion then reflects from the boundary at the input of the low shock-impedance layer, and since it has been sped up, the reflected portion eventually catches up with the portion of the shock that was initially transmitted into the high shock-impedance layer 132. Through the arrangement of the low and high shock-impedance layers 130, 132, the component 101 can be arranged such that a plurality of shock portions superimpose on the output face 112 of the component 101, leading to a short-lived high shock pressure state that can be passed into a target adjacent to the component output 112.

In the illustrated embodiment, all of the high shock-impedance layers 132 are formed from the same material, and all of the low shock-impedance layers 130 are formed from the same material. In embodiments, different low shock-impedance materials may be used for the different low shock-impedance layers 130, and different high shock-impedance materials may be used for the different high shock-impedance layers 132.

Figure 7:
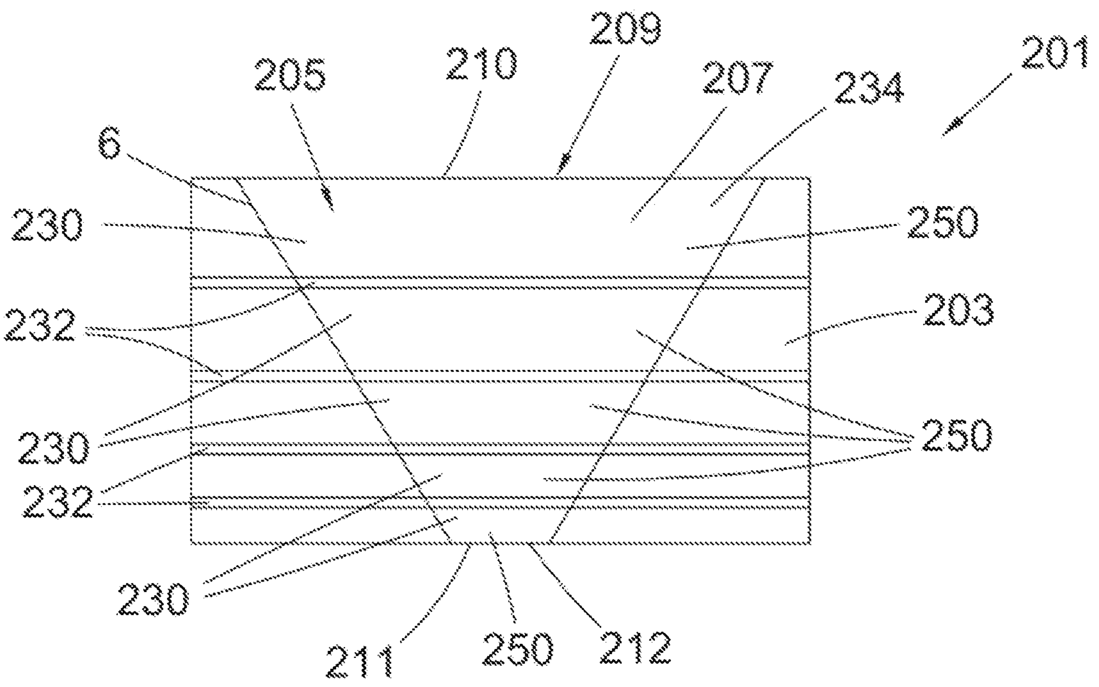
FIG. 7 shows an embodiment of a component comprising the features of the embodiment of FIG. 1 and the embodiment of FIG. 6.

FIG. 7 shows a component 201 according to another embodiment of the invention, encompassing features from both the embodiment of FIG. 1, and the embodiment of FIG. 6. The component 201 comprises a body 203 which defines a hollow conic frustum shaped cavity 205. The body 203 is formed of a material having a high shock-impedance. The cavity 205 contains a material 207 having a low shock-impedance. The cavity fill material 207 has a lower shock-impedance than that of the body 203. Within the cavity 205, a plurality of parallel high shock-impedance layers 232 are provided.

In the illustrated embodiment, the high shock-impedance layers 232 are formed as plates which span the cross-sectional area of the component 201. The body 203 itself is therefore formed of layers, each layer defining a frustum shaped sub-cavity 250. In embodiments however, the high shock-impedance layers 232 may only span the cavity 205 such that the body 203 may be formed as a single piece. The cavity 205 has an input 209 which is configured to receive a shockwave, and an output 211 which is configured to output the shockwave after the shockwave has propagated through the component 201. The cross-sectional area of the input 209 is greater than that of the output 211.

FIG. 7 shows a vertical cross section, but in the illustrated embodiment, the component 201 is rotationally symmetrical. It will therefore be understood that the cavity 205 of the component 201 is shaped as a conic frustum with an input radius greater than the output radius, as can be more clearly seen from the perspective cut-through view of a variant of the embodiment shown in FIG. 8. The component 201 itself has an input face 210 which is proximal to the input 209 of the cavity 205, and an output face 212 which is proximal to the output 211 of the cavity 205.

The cavity 205 is filled with low shock-impedance layers 230 which are formed from the low shock-impedance cavity fill material 207 (PMMA in the illustrated embodiment), and high shock-impedance layers 232 formed from the high shock-impedance material (tantalum in the illustrated embodiment) plates. As a minimum requirement, the high shock-impedance layers 232 is formed of a material having a higher shock-impedance than the material forming the low shock-impedance layers 230.

The parallel layers alternate from low shock-impedance layers 230 to high shock-impedance layers 232 from one layer to the next. In the illustrated embodiment, an input layer 234 which forms the input face 210 of the component 201 is a low shock-impedance layer 230. This is because an input face 210 formed from a high shock-impedance layer 232 would result in a larger portion of the shockwave being reflected by the input face 210, and hence not transmitted into the component 201.

In the illustrated embodiment, the high shock-impedance layers 232 are each of equal thickness, whilst the low shock-impedance layers 230 have thicknesses that decrease progressively from the input face 210 to the output face 212. It will be understood that although the thickness may vary between layers, each individual layer has a uniform thickness across its width.

The integration of the focusing shape of the frustum shaped cavity 205 with the parallel layers 230, 232 leads to a component design which has been shown to be capable of greatly increasing shock pressures on output, relative to either of the features individually. Shock reflections from the walls of the cavity 205 interact with axial shock reflections from the high shock-impedance layers 232, creating regions of locally high thermodynamic pressure. These high-pressure regions expand and interact with further shock reflections downstream in the component 201, creating regions with yet-higher shock pressure, that eventually pass through to the output 211 of the cavity 205.

When a shock passes from a low shock-impedance layer 230 into a high shock-impedance layer 232, a portion of the shock is transmitted into the high shock-impedance layer 232 whilst a portion is reflected back into the low shock-impedance layer 230. The portion in the low shock-impedance layer 230 speeds up since it is now travelling through pre-shocked material, the shock portion then reflects from the boundary at the input of the low shock-impedance layer 230, and since it has been sped up, the reflected portion eventually catches up with the portion of the shock that was initially transmitted into the high shock-impedance layer 232. The shockwave is also tangentially focused by the cavity walls 6.

Through configuration of the parallel layer materials and thicknesses, as well as the shape of the cavity 205, it is possible to control the pressure of the shock at the output 211, as well as the uniformity of the shock state and shape. It will be understood that although the thickness may vary between layers, each individual layer has a uniform thickness across its width.

In addition to generating the conditions for local shock superposition and constructive interference, the parallel layers 230, 232 also act to effectively slow the shock transit time through the component 201. This allows energy from more of the projectile 13 to be harvested and combined into a single shock state upon emergence from the component 201.

Figure 8:
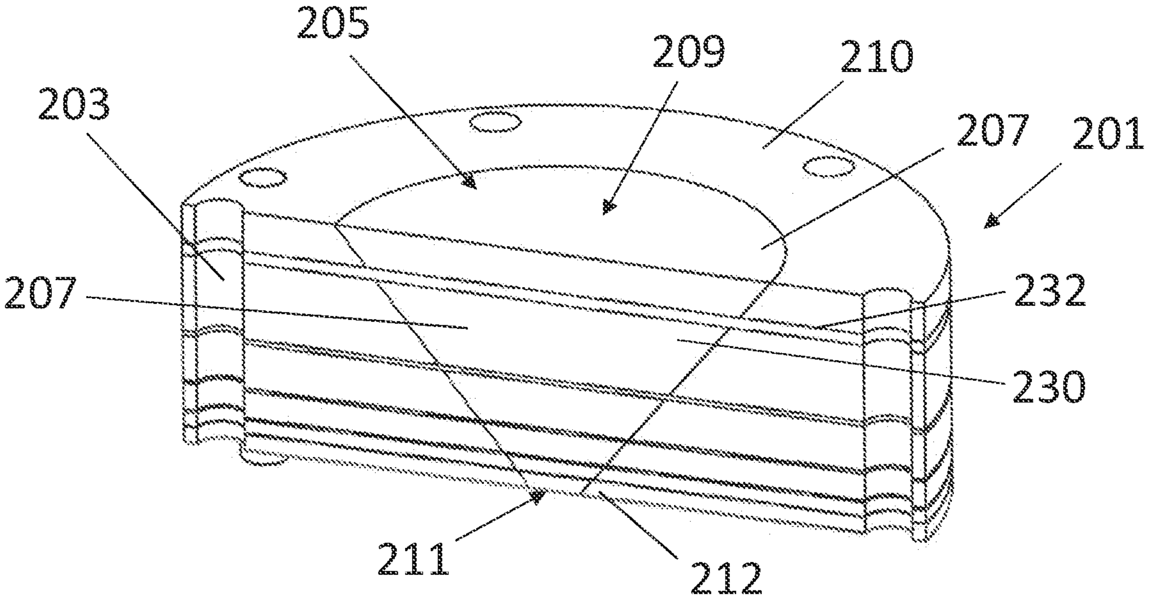
FIG. 8 shows a perspective cutaway view of a variant of the embodiment of FIG. 7

FIG. 8 shows a cut-through perspective view of a variant of the embodiment of FIG. 7 in which the thickness of the high shock-impedance layers 232 also decreases from the input 209, to the output 211. FIG. 8 clearly illustrates the plate structure of the component 201.

Simulations and experiments have shown that a pressure multiplication factor of at least 15 is achievable for an input-radius/exit-radius ratio of ~8.9 for a component design in line with the embodiment of FIG. 8. For example, in simulations, with an input shockwave having a pressure of 83 GPa, an output pressure of 1240 GPa was achieved.

Figure 9:
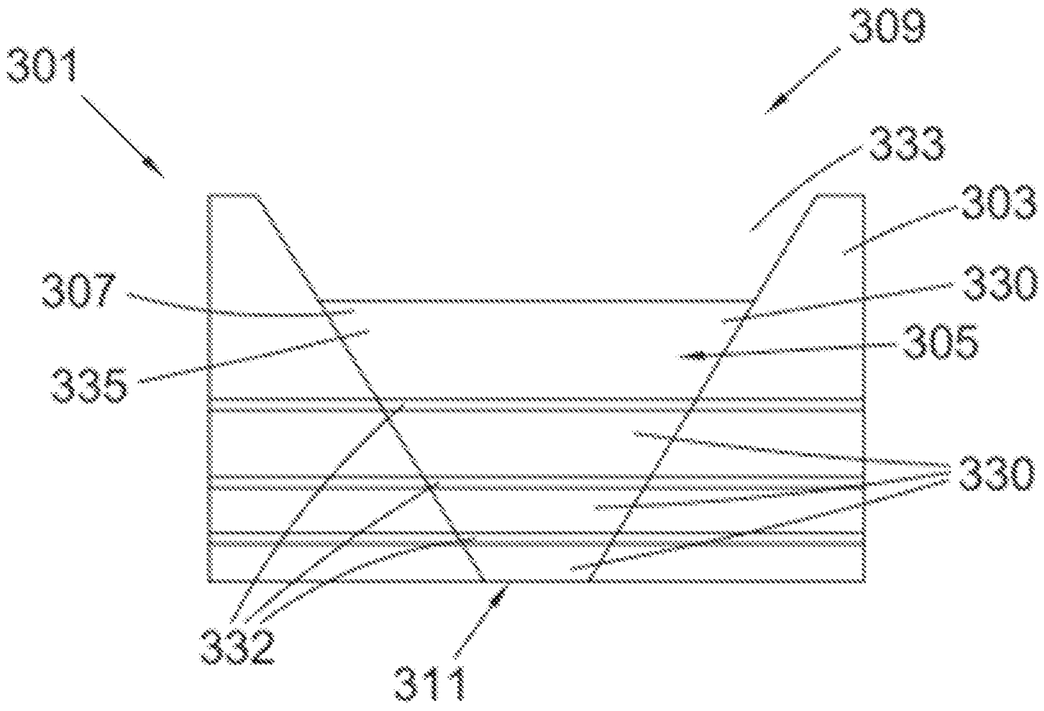
FIG. 9 shows a variant of the embodiment of FIG. 7 comprising a vacuum layer.

FIG. 9 shows a variant of the embodiment of FIG. 7, wherein the layer 333 at the input 309 is vacuum. In embodiments, the layer 333 may not be vacuum, and may instead contain a gas. The first non-vacuum filled layer 335 in the cavity 305 is preferably a low shock-impedance layer 330 because a first non-vacuum filled layer 335 formed from a high shock-impedance layer 332 would result in a larger portion of the shockwave being reflected by the first non-vacuum filled layer 335, and hence not transmitted into the rest of the component 301. However, the alternative is also envisaged.

In the embodiment of FIG. 9, the impacting projectile 13 only strikes the body 303 of the component 301 directly. This leads to the generation of an axially converging shock reflection within the projectile 13, that passes into the cavity fill material 307 when the front face of the projectile 13 contacts the first non-vacuum filled layer 335. These transmitted-reflected shocks subsequently superimpose on the central axis within the cavity 305, leading to the generation of a high pressure state that expands as a Mach stem towards the output 311. It is preferable that the projectile 13 is smaller than the cavity input 309 such that the edges of the projectile first strike the cavity wall 6. The function of the cavity 305 and the subsequent parallel layers 330, 332, is as described above in relation to FIG. 7.

In simulations, a component in line with the embodiment of FIG. 9 has achieved a pressure multiplication factor of 5, with an input shockwave having a pressure of 140 GPa, and an output shockwave having a pressure of 700 GPa.

Figure 10:
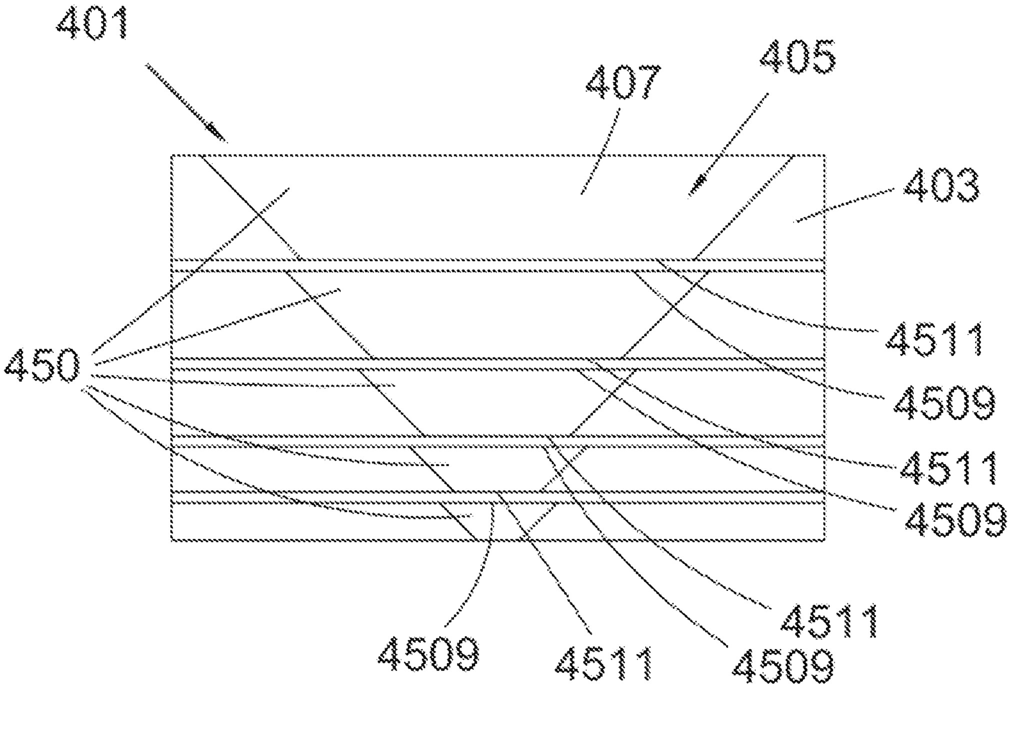
FIG. 10 shows a variant of the embodiment of FIG. 7.

FIG. 10 shows a variant of the embodiment of FIG. 7 in which the cavity 405 has a different shape. As in the embodiment of FIG. 7, the body 403 is formed of a plurality of layers, each layer defining a frustum shaped sub-cavity 450 having an input 4509 and an output 4511. In the illustrated embodiment, each sub-cavity is a conical frustum, but other shapes are considered. In the embodiment of FIG. 10, the cross-sectional area of the input 4509 of each sub-cavity 450 is greater than the cross-sectional area of the output 4511 of the preceding sub-cavity. In conical frustum embodiments, this means that the radius of the input 4509 of each sub-cavity is greater than the radius of the output 4511 of the preceding sub-cavity.

The component 401 shown in FIG. 10 functions in substantially the same way as described above in relation to FIG. 7, but the overlapping outputs 4511 and inputs 4509 enables shocks that are transmitted from the cavity fill material 407 of a sub-cavity 450 into the body 403 of the component 401 to be partially recaptured by the input 4509 of the subsequent sub-cavity 450, and focused back into the cavity fill material 407 contained in that sub-cavity. This may lead to a reduced amount of shock loss and hence a more efficient component 401. Further, since the sub-cavities 450 are discrete, the different sub-cavities 450 can have different properties such as input diameter, output diameter, thickness, material, and sub-cavity wall angle. It will be understood that although the thickness may vary between layers, each individual layer has a uniform thickness across its width.

Figure 11:
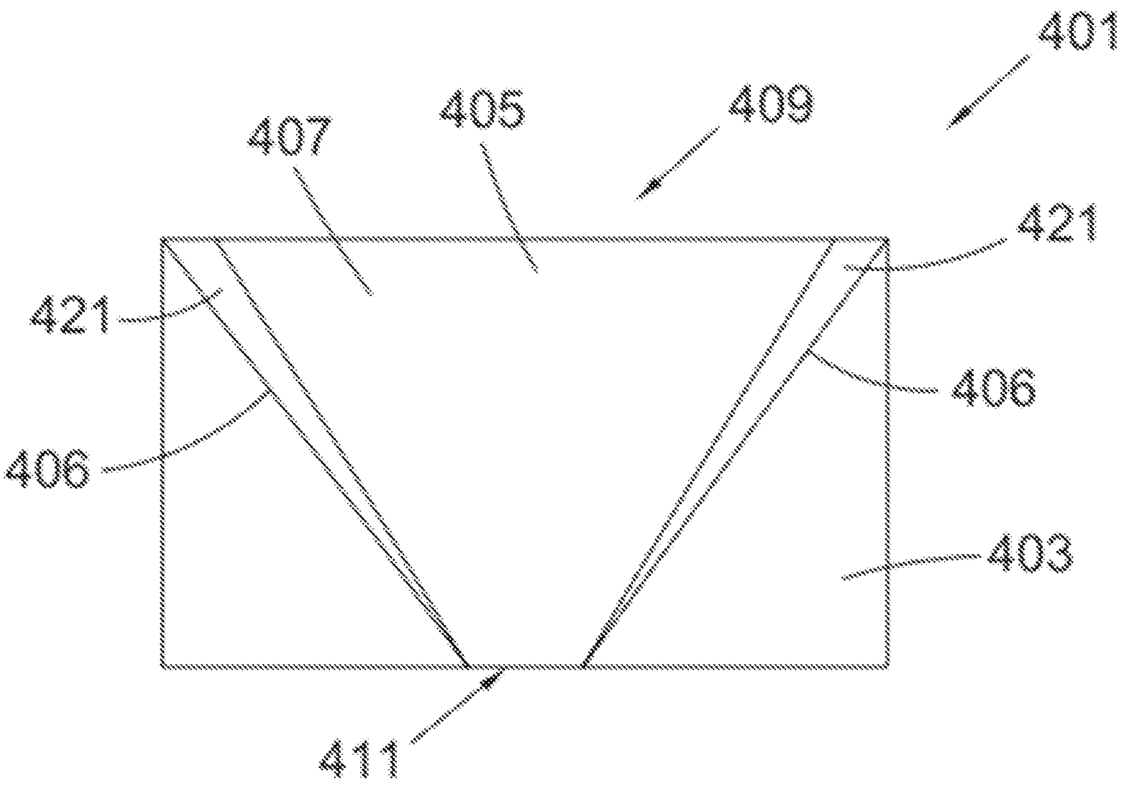
FIG. 11 shows a variant of the embodiment of FIG. 1.

FIG. 11 shows a variant of the embodiment of FIG. 1 in which the cavity wall 406 of the component 401 is coated with a barrier 421 which has a shock-impedance between that of the cavity fill material 407, and that of the body 403. In the illustrated embodiment, the barrier 421 is formed of aluminium, the cavity fill material 407 is a PMMA, and the body 403 is formed of tantalum, although other materials are considered. The thickness of the barrier 421 decreases from the cavity input 409, to the cavity output 411, however in other embodiments, the barrier 421 may have a uniform thickness. The barrier 421 may be formed as a frustoconical insert. The barrier 421 has a thickness which is an order of magnitude less than the diameter of the cavity 405. As such, the barrier 421 has a thickness between 0.1 mm and 1 mm. The barrier 421 acts as a waveguide to direct the shockwave towards the cavity output 411 rather than into the cavity wall 406.

Figure 12:
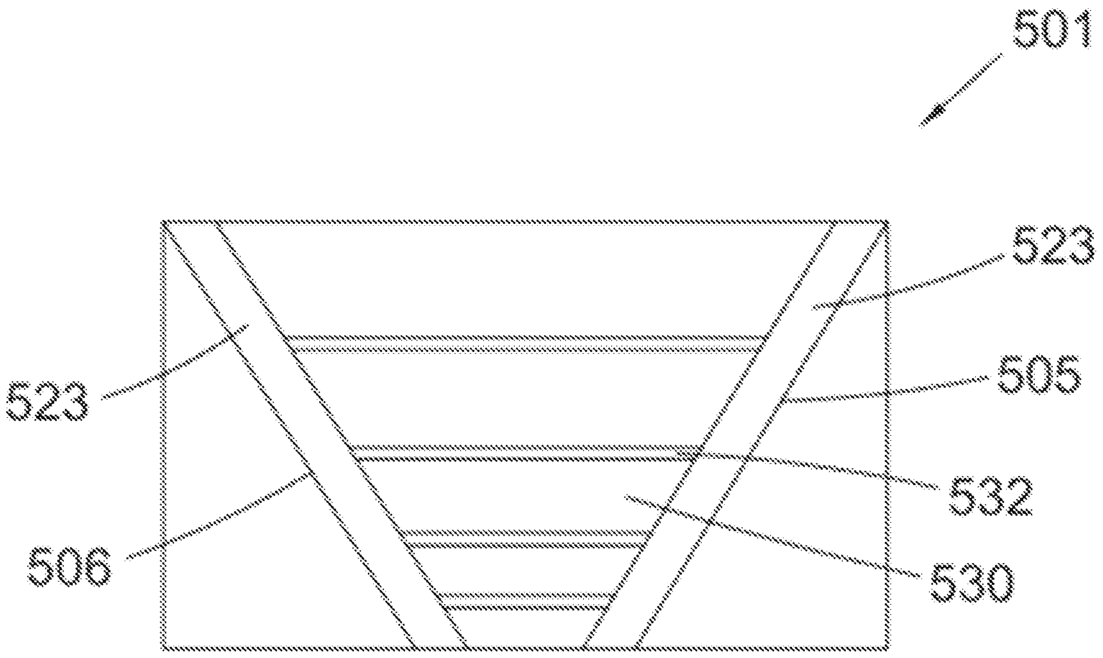
FIG. 12 shows a variant of the embodiment of FIG. 7.

FIG. 12 shows a variant of the embodiment of FIG. 7. The component 501 comprises a buffer 523 between the edges of the parallel layers 530, 532, and the cavity wall 506. The buffer 523 is formed of a low density material such as PMMA or epoxy resin, and may be formed of the same material as the low shock-impedance layers 532. The buffer 523 may help to reflect the shocks from the cavity wall 506.

Figure 13:
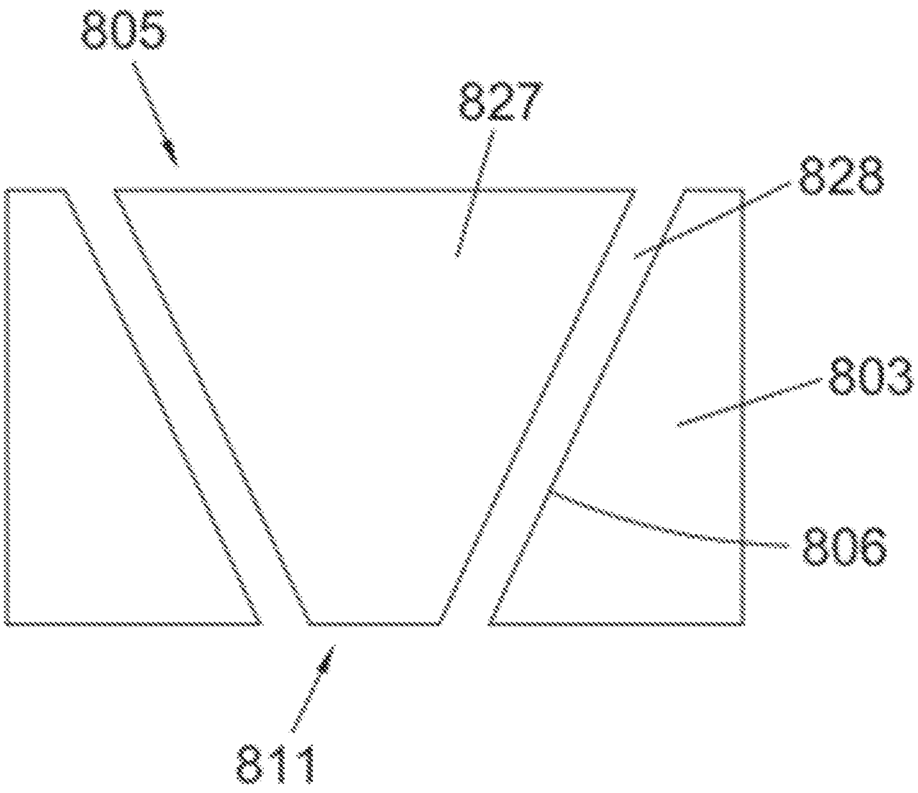
FIG. 13 shows a variant of the embodiment of FIG. 1.

FIG. 13 shows a variant of the embodiment of FIG. 1. The component 801 cavity 805 contains a frustoconical element

827, formed of a plastic material such as PMMA or epoxy resin, which is separated from the cavity wall 806 by a vacuum gap 828. As a projectile 13 strikes the body 803 and the frustoconical element 827, the vacuum gap 828 closes due to the deformation of the body 803 and the frustoconical element 827. The closure of the vacuum gap 828 drives a shock into the element 827. The shock may travel faster in the body 803 due to its higher density, and hence the body 803 may be pre-compressed by the shock. This pre-compression of the body increases its shock-impedance which helps to better focus the shock in the element 827 towards the cavity output 811 since the shock will be reflected from the cavity wall 806.

Although specific examples have been given, it will be appreciated that there are a large number of parameters that influence the actual results achieved.

In each of the embodiments described above, the diagrams shown are a vertical cross-section through a three-dimensional component and hence they depict embodiments that are rotationally symmetric. However, this is not essential to the invention.

It will be understood that the embodiments explicitly disclosed herein are intended to be exemplary, and the skilled person will understand that features of the embodiments disclosed herein may, except where mutually exclusive, be combined in combinations not explicitly mentioned in order to form new embodiments.

Embodiments of the invention may be suitable for amplifying shockwaves for the purpose of generating conditions suitable for nuclear fusion. However, the invention is not limited to this, and may be used for other applications, for example, the testing of safety equipment such as crash helmets. In one specific example, the invention could be used to provide an impact shockwave for testing the impact force dampening and defusing structure shown in U.S. Pat. No. 10,653,193 B2.

Further, although the specific embodiments disclosed herein are configured to achieve a flat pressure pulse output, some applications may require different pulse shapes, and components in accordance with the invention may be configured (via their geometry, and the arrangement of any layers present) to provide differently shaped output pressure pulses.

The invention claimed is:

1. A component for manipulating an input shockwave, wherein the component comprises:

a body comprising a first material;

wherein the body defines a cavity for manipulating the input shockwave so to produce a manipulated shockwave;

wherein the cavity comprises:

an input for receiving the input shockwave incident upon the component;

an output for outputting the manipulated shockwave from the cavity; and a plurality of layers between the input and the output;

wherein the plurality of layers comprises one or more layers comprising a second material having a shock-impedance that is lower than a shock-impedance of the first material; and wherein the plurality of layers are configured such that components of the input shockwave are reflected from boundaries between the layers, and superimpose at the output.

2. The component as claimed in claim 1, wherein the body is shaped such that a cross-sectional area of the input is greater than a cross-sectional area of the output.

3. The component as claimed in claim 1, wherein the cavity comprises a frustum.

4. The component as claimed in claim 1, wherein the cavity comprises a conic frustum.

5. The component as claimed in claim 1, wherein the cavity comprises two or more sections that are at different respective angles to the axis of the cavity.

6. The component as claimed in claim 1, comprising one or more impedance matching layers.

7. The component as claimed in claim 6, wherein the one or more impedance matching layers comprises an input impedance matching layer adjacent to the input of the cavity, wherein the input impedance matching layer comprises a planar layer of a material having a shock-impedance that is greater than the shock-impedance of the second material.

8. The component as claimed in claim 6, wherein the one or more impedance matching layers comprises an output impedance matching layer adjacent to the output of the cavity, comprising a planar layer of a material having a shock-impedance that is less than the shock-impedance of the second material.

9. The component as claimed in claim 1, wherein the cavity is partially filled with the second material.

10. The component as claimed in claim 1, wherein the plurality of layers comprises at least one first layer and at least one second layer, wherein the at least one first layer comprises a third material, and the at least one second layer comprises the second material.

11. The component as claimed in claim 10, wherein the third material has a higher shock-impedance than the shock-impedance of the second material.

12. The component as claimed in claim 10, wherein the plurality of layers alternate between least one first layer and the least one second layer.

13. The component as claimed in claim 1, wherein the cavity comprises a first sub-cavity and a second sub-cavity arranged between the input of the cavity and the output of the cavity, wherein the first sub-cavity comprises an input and an output, and the second sub-cavity comprises an input and an output, wherein the output of the first sub-cavity is coupled to the input of the second sub-cavity.

14. The component as claimed in claim 13, wherein the body is shaped such that a cross-sectional area of the output of the first sub-cavity is less than a cross-sectional area of the input of the second sub-cavity.

15. The component as claimed in claim 14, wherein the cavity comprises a plurality of sub-cavities, wherein each sub-cavity comprises an input and an output, wherein the output of each sub-cavity is coupled to the input of the subsequent sub-cavity, wherein the body is shaped such that a cross-sectional area of the output of each sub-cavity is less than a cross-sectional area of the input of the subsequent sub-cavity.

16. The component as claimed in claim 13, wherein the cavity comprises a layer between the first and second sub-cavities.

17. A component as claimed in claim 1, wherein the cavity comprises a spacing between the input of the cavity and an input surface of the second material.

18. A component for manipulating an input shockwave, wherein the component comprises:

a body comprising a first material;

wherein the body defines a cavity for manipulating the input shockwave so to produce a manipulated shockwave;

wherein the cavity comprises:

an input for receiving the input shockwave incident upon the component;

an output for outputting the manipulated shockwave from the cavity;

a first sub-cavity and a second sub-cavity arranged between the input of the cavity and the output of the cavity;

wherein the first sub-cavity comprises an input and an output, and the second sub-cavity comprises an input and an output;

wherein the output of the first sub-cavity is coupled to the input of the second sub-cavity; and wherein the body is shaped such that a cross-sectional area of the output of the first sub-cavity is less than a cross-sectional area of the input of the second sub-cavity.

* * * * *